(12) United States Patent
Basu et al.

(10) Patent No.: US 10,403,311 B1
(45) Date of Patent: Sep. 3, 2019

(54) WRITE POLE SHIELD HAVING A LOW SATURATION MAGNETIZATION LAYER

(71) Applicant: Seagate Technology LLC, Cupertino, CA (US)

(72) Inventors: Swaraj Basu, Londonderry (GB); Prim Gangmei, Londonderry (GB); Angela Moore, Co. Donegal (IE); Mark Anthony Gubbins, Co. Donegal (IE); Beverley R. McConnell, Londonderry (GB)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 15/664,628

(22) Filed: Jul. 31, 2017

(51) Int. Cl.
*G11B 5/11* (2006.01)
*G11B 5/23* (2006.01)
*G11B 5/31* (2006.01)
*G11B 5/127* (2006.01)

(52) U.S. Cl.
CPC .............. *G11B 5/315* (2013.01); *G11B 5/11* (2013.01); *G11B 5/112* (2013.01); *G11B 5/1278* (2013.01); *G11B 5/23* (2013.01); *G11B 5/3116* (2013.01)

(58) Field of Classification Search
None
See application file for complete search history.

(56) References Cited

U.S. PATENT DOCUMENTS

| | | | | |
|---|---|---|---|---|
| 8,295,008 | B1* | 10/2012 | Sasaki et al. | G11B 5/315 360/125.3 |
| 8,582,238 | B1* | 11/2013 | Liu et al. | G11B 5/315 360/125.3 |
| 8,767,347 | B1* | 7/2014 | Sasaki et al. | G11B 5/315 360/125.13 |
| 9,214,165 | B1 | 12/2015 | Liu et al. | |
| 9,286,919 | B1 | 3/2016 | Liu et al. | |
| 9,443,541 | B1 | 9/2016 | Liu et al. | |
| 9,466,319 | B1 | 10/2016 | Tang et al. | |
| 9,502,055 | B1* | 11/2016 | Misra et al. | G11B 5/315 |
| 2010/0165517 | A1* | 7/2010 | Araki et al. | G11B 5/315 360/319 |
| 2011/0205671 | A1* | 8/2011 | Benakli et al. | G11B 5/315 360/125.3 |
| 2011/0216443 | A1* | 9/2011 | Hirata et al. | G11B 5/315 360/123.12 |
| 2012/0140356 | A1 | 6/2012 | Horide | |
| 2014/0063657 | A1 | 3/2014 | Gao et al. | |
| 2014/0153133 | A1* | 6/2014 | Heim et al. | G11B 5/315 360/125.03 |
| 2015/0002959 | A1* | 1/2015 | Basu et al. | G11B 5/315 360/125.03 |
| 2015/0131183 | A1 | 5/2015 | Katada et al. | |

* cited by examiner

*Primary Examiner* — Craig A. Renner
(74) *Attorney, Agent, or Firm* — Westman, Champlin & Koehler, P.A.

(57) ABSTRACT

A recording head that includes a bearing surface and a write pole having a front surface that forms a portion of the bearing surface. The recording head also includes a side shield for the write pole. The side shield includes a low saturation magnetization cap layer having a front surface that forms a portion of the bearing surface. The side shield also includes a main side shield layer having a saturation magnetization that is higher than a saturation magnetization value of the low saturation magnetization cap layer.

18 Claims, 18 Drawing Sheets

WRITE POLE SHIELD HAVING A LOW SATURATION MAGNETIZATION LAYER

BACKGROUND

Data storage devices use magnetic recording heads to read and/or write data on magnetic storage media, such as data storage discs. Magnetic recording heads typically include inductive write elements to record data on the storage media. An inductive write element or transducer may include a main pole having a pole tip and one or more return poles. Current is supplied to write coils to induce a flux path in the main pole to record data on one or more magnetic storage layers of the media.

With ever-increasing levels of recording density in disc drives, the write element needs to have correspondingly better data-recording capabilities and needs to be reliable.

SUMMARY

Embodiments of the disclosure relate to write pole side shields for a recording head that include features that help improve reliability and/or performance of the recording head.

In one embodiment, a recording head is provided. The recording head includes a bearing surface and a write pole having a front surface that forms a portion of the bearing surface. The recording head also includes a side shield for the write pole. The side shield includes a low saturation magnetization cap layer having a front surface that forms a portion of the bearing surface. The side shield also includes a main side shield layer having a saturation magnetization that is higher than a saturation magnetization value of the low saturation magnetization cap layer.

Other features and benefits that characterize embodiments of the disclosure will be apparent upon reading the following detailed description and review of the associated drawings.

DETAILED DESCRIPTION OF ILLUSTRATIVE EMBODIMENTS

Embodiments of the disclosure relate to write pole side shields for a recording head that include features that help improve reliability and/or performance of the recording head. However, prior to providing details regarding the different embodiments, a description of an illustrative operating environment is provided below.

Figure 1A:
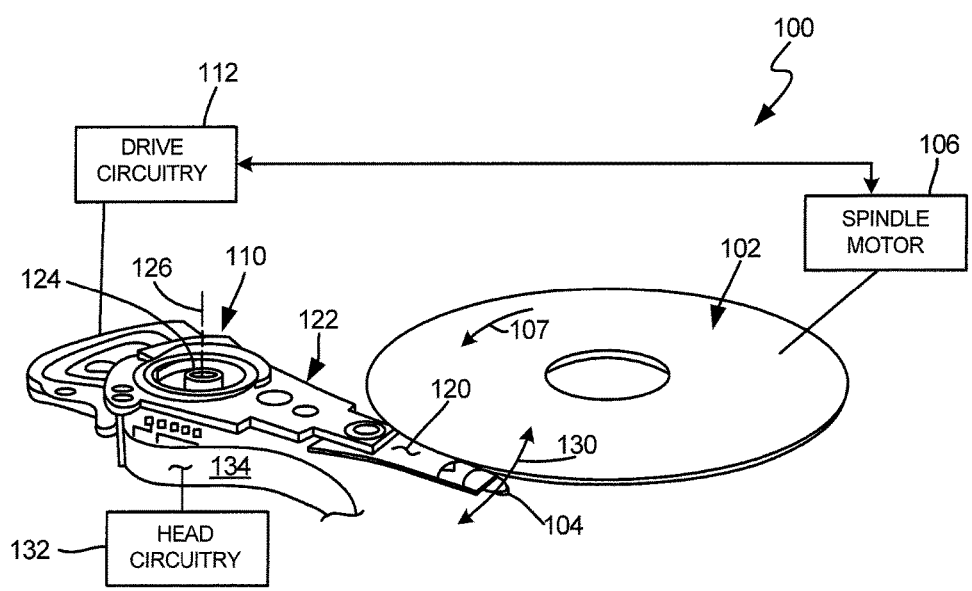
FIG. 1A illustrates an embodiment of a data storage device in which embodiments of the present application can be used.

FIG. 1A shows an illustrative operating environment in which certain recording head embodiments as disclosed herein may be incorporated. The operating environment shown in FIG. 1A is for illustration purposes only. Embodiments of the present disclosure are not limited to any particular operating environment such as the operating environment shown in FIG. 1A. Embodiments of the present disclosure are illustratively practiced within any number of different types of operating environments.

It should be noted that like reference numerals are used in different figures for same or similar elements. It should also be understood that the terminology used herein is for the purpose of describing embodiments, and the terminology is not intended to be limiting. Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that, unless indicated otherwise, any labels such as "left," "right," "front," "back," "top," "bottom," "forward," "reverse," "clockwise," "counter clockwise," "up," "down," or other similar terms such as "upper," "lower," "aft," "fore," "vertical," "horizontal," "proximal," "distal," "intermediate" and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

FIG. 1A is a schematic illustration of a data storage device 100 including a data storage medium and a head for reading data from and/or writing data to the data storage medium. As shown in FIG. 1A, the data storage device 100 includes a data storage medium or disc 102 and a head 104. The head 104 including one or more transducer elements (not shown in FIG. 1A) is positioned above the data storage medium 102 to read data from and/or write data to the data storage medium 102. In the embodiment shown, the data storage medium 102 is a rotatable disc or other magnetic storage medium that includes a magnetic storage layer or layers. For read and write operations, a spindle motor 106 (illustrated schematically) rotates the medium 102 as illustrated by arrow 107 and an actuator mechanism 110 positions the head 104 relative to data tracks on the rotating medium 102. Both the spindle motor 106 and actuator mechanism 110 are connected to and operated through drive circuitry 112 (schematically shown). The head 104 is coupled to the actuator mechanism 110 through a suspension assembly which includes a load beam 120 connected to an actuator arm 122 of the mechanism 110 for example through a swage connection.

The one or more transducer elements of the head 104 are coupled to head circuitry 132 through flex circuit 134 to encode and/or decode data. Although FIG. 1A illustrates a single load beam 120 coupled to the actuator mechanism 110, additional load beams 120 and heads 104 can be coupled to the actuator mechanism 110 to read data from or write data to multiple discs of a disc stack. The actuator mechanism 110 is rotationally coupled to a frame or deck (not shown) through a bearing 124 to rotate about axis 126. Rotation of the actuator mechanism 110 moves the head 104 in a cross track direction as illustrated by arrow 130.

Figure 1B:
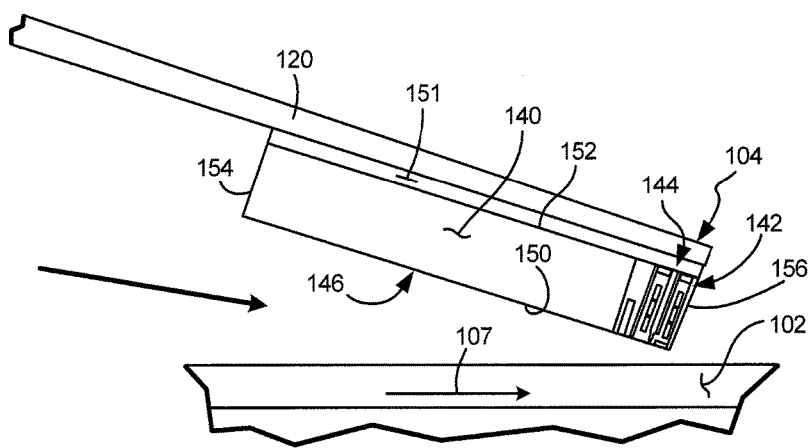
FIG. 1B is a schematic illustration of a head including one or more transducer elements above a magnetic recording medium.

FIG. 1B is a detailed illustration (side view) of the head 104 above the medium 102. The one or more transducer elements on the head 104 are fabricated on a slider 140 to form a transducer portion 142 of the head 104. The transducer portion 142 shown includes write elements encapsulated in an insulating structure to form a write assembly 144 of the head. As shown, the head 104 includes a bearing surface (for example, and air bearing surface (ABS)) 146 along a bottom surface 150 of the head or slider facing the medium 102. The head 104 is coupled to the load beam 120 through a gimbal spring 151 coupled to a top surface 152 of the head or slider 140 facing away from the medium 102. The medium 102 can be a continuous storage medium, a discrete track medium, a bit patterned medium or other magnetic storage medium including one or more magnetic recording layers.

During operation, rotation of the medium or disc 102 creates an air flow in direction 107 as shown in FIG. 1B along the air bearing surface 146 of the slider 140 from a leading edge 154 to the trailing edge 156 of the slider 140 or head 104. Air flow along the air bearing surface 146 creates a pressure profile to support the head 104 and slider 140 above the medium 102 for read and/or write operations. As shown, the transducer portion 142 is formed at or near the trailing edge 156 of the slider 140. A transducer/head portion in accordance with one embodiment is described below in connection with FIGS. 2A and 2B.

Figure 2A:
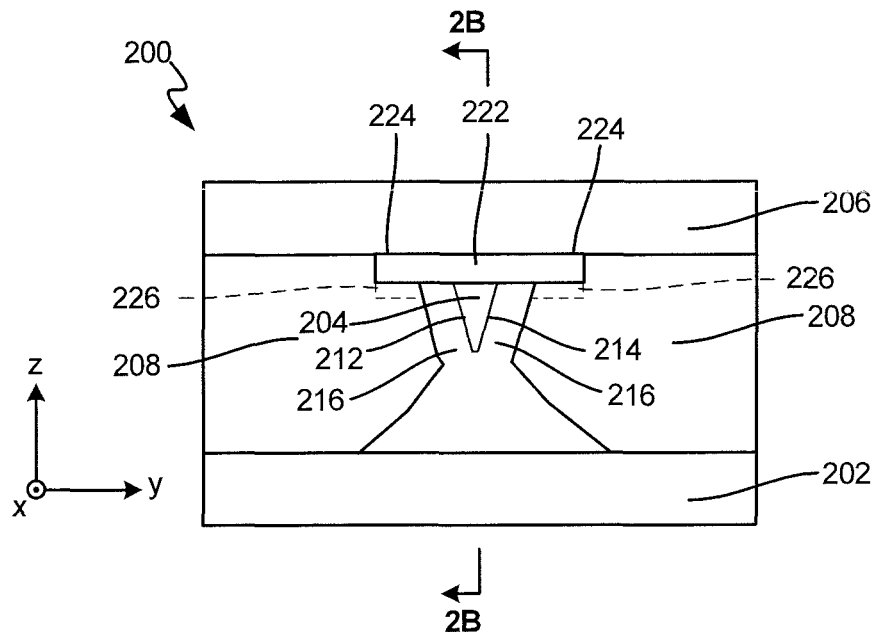
FIG. 2A depicts a bearing surface view of a perpendicular magnetic recording (PMR) transducer in accordance with one embodiment.
Figure 2B:
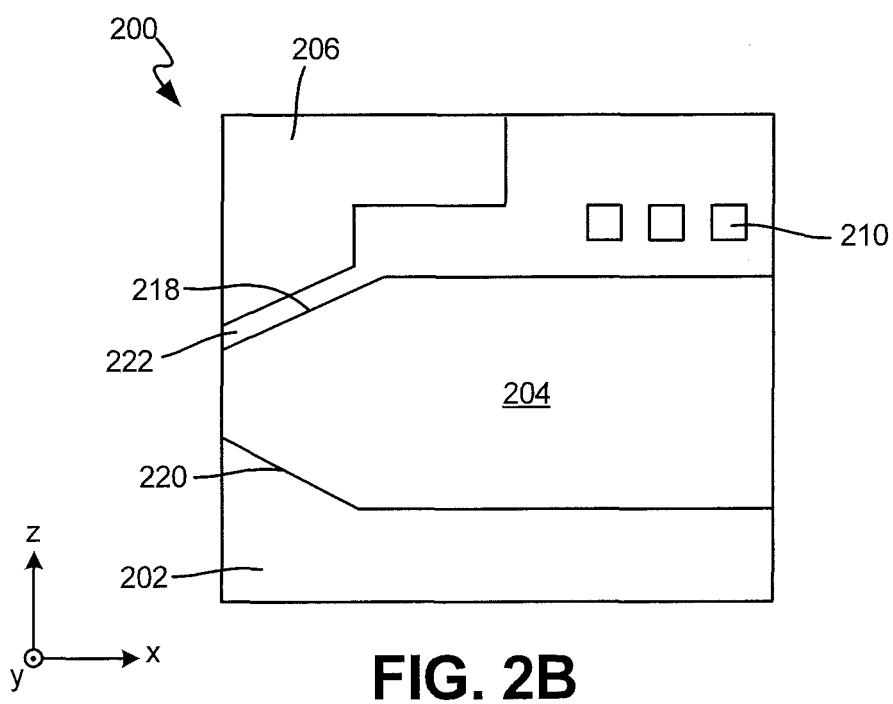
FIG. 2B depicts a side view of the PMR transducer of FIG. 2A.

FIGS. 2A and 2B depict ABS and side views, respectively, of a perpendicular magnetic recording (PMR) transducer 200. The PMR transducer 200 may be a part of a merged head including the write transducer 200 and a read transducer (not shown). Alternatively, the magnetic recording head may be a write head only including the write transducer 200. The PMR transducer elements shown in FIGS. 2A and 2B are illustratively included in a recording head such as recording head 104 of FIGS. 1A and 1B.

The write transducer 200 includes an under-layer/substrate 202, a main pole 204, a trailing edge shield 206 and side shields 208. The under-layer 202 may include multiple structures which are under the pole 204. In some embodiments, the multiple structures may include read sensor layers, read sensor shields, etc. In other embodiments, no read sensor structures may be included. The write transducer 200 may also include other components including but not limited to coils (denoted by reference numeral 210 in FIG. 2B) for energizing the main pole 204.

The main pole 204 resides over under-layer 202 and includes sidewalls 212 and 214. Sidewalls 212 and 214 are separated from the side shields 208 by non-magnetic side shield gaps (SSGs) 216. The top (trailing) surface of the main pole 204 also has a beveled portion 218. The bottom (leading) surface of the main pole 204 may also include a leading surface bevel 220. A Trailing edge shield gap (TSG) 222 is formed between the trailing edge shield 206 and the main pole 204.

Figure 2C:
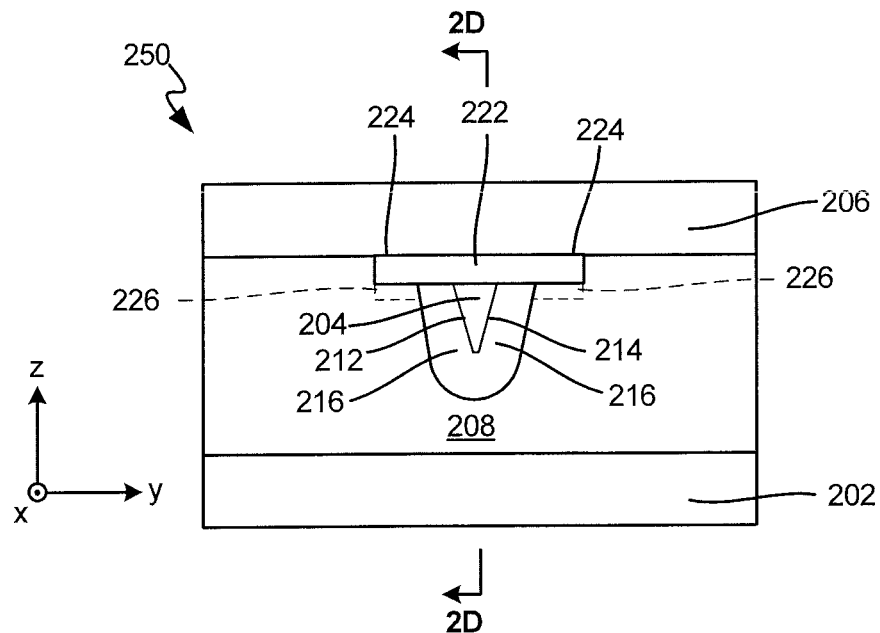
FIG. 2C depicts a bearing surface view of a PMR transducer in accordance with another embodiment.
Figure 2D:
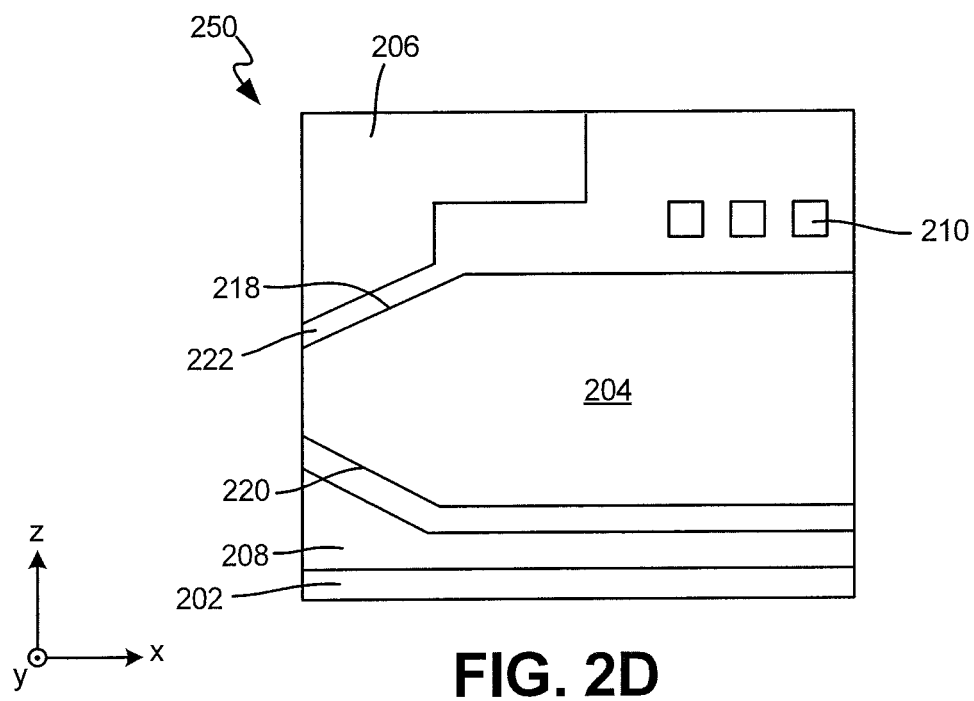
FIG. 2D depicts a side view of the PMR transducer of FIG. 2C.

FIGS. 2C and 2D depict air bearing surface and side views, respectively, of a perpendicular magnetic recording (PMR) transducer or head 250 that has a wrap-around shield configuration in accordance with another embodiment. As can be seen in FIG. 2C, side shields 208 are connected below a leading edge or bottom edge of the main pole 204. In other respects, heads 200 and 250 are substantially similar.

In write heads/transducers 200 and 250, the TSG 222 extends over or outside the SSGs 216 in a cross-track direction, forming overhangs 224 that separate the trailing edge shield 206 from portions of the side shields 208. The overhangs 224 may be produced by a write head fabrication process that employs photo patterning to define a shape and dimensions of TSG 222 as part of the steps for its formation. In general, a recording head with a TSG including overhangs may have certain on-track performance advantages, but may also produce side track erasure (STE) and adjacent track interference (ATI) which may be detrimental to a reliability of the recording head, particularly at high data-writing rates.

Tests show that the erasure field is strongest along the side shield (SS)-TSG edge adjacent to the write pole. This erasure field is in-phase with the writer pole field. Accordingly, any method to reduce this field will help reduce erasure risks.

The side shields may also suffer from an intermittent reversed shield condition (e.g., a condition in which an original or set magnetization direction of the shields is switched). Under a reversed shield condition, erasure fields dramatically increase in the write head. A reduction of erasure fields by low activation of the side shields may help check erasure fields generated from the reversed shield condition.

New generation writers are designed to achieve relatively high tracks per inch (TPI) and bits per inch (BPI). Reduction of the gaps between the write pole and the side shields (e.g., SSG 216 reduction) may achieve high TPI and BPI. However, this could result in a reduction of the write field due to an increase in leakage of flux from the write pole to the closely located shields. If the field loss is substantial, gradient loss might occur, which can hamper BPI capability.

To address the above erasure-related problems, embodiments of the disclosure replace a top portion 226 of the side shield 208 along the overhang region 224 with a thin layer of low saturation magnetization ($B_S$) material. As will be described in detail further below, in some embodiments, the low $B_S$ SS cap layer may extend all the way up to a back of the side shield 208 in an x direction (e.g., a stripe height direction). In certain other embodiments, the low $B_S$ SS cap layer may be present only in a front portion of the side shield 208. In some embodiments, low $B_S$ SS cap layer may not extend beyond overhang region 224 in a y direction (e.g., a cross-track direction). In addition to addressing erasure-related problems, writer performance benefits are also provided by such embodiments.

In some embodiments, a potential loss of field that may result from relatively small gaps between the write pole and the side shields may be made up by removing a part of the shield material at the back of the side shield 208, thereby creating a step (not shown in FIGS. 2A-2D) in the side shield 208 at its back. In some embodiments, the step feature may not extend beyond overhang region 224 in the y direction (e.g., the cross-track direction). Embodiments including the low $B_S$ SS cap layer in the side shield 208 are first described below in connection with FIGS. 3A-3E. Thereafter, embodiments including the step feature in the side shield are described in connection with FIGS. 5A-5J.

Figure 3A:
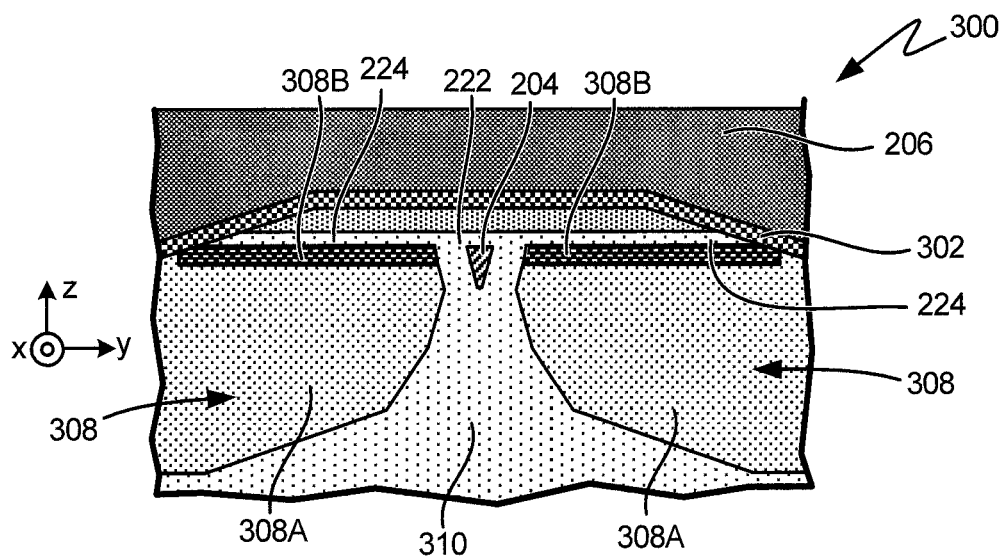
FIG. 3A shows a bearing surface view of a write head that includes a low saturation magnetization side shield cap layer in accordance with one embodiment.
Figure 3B:
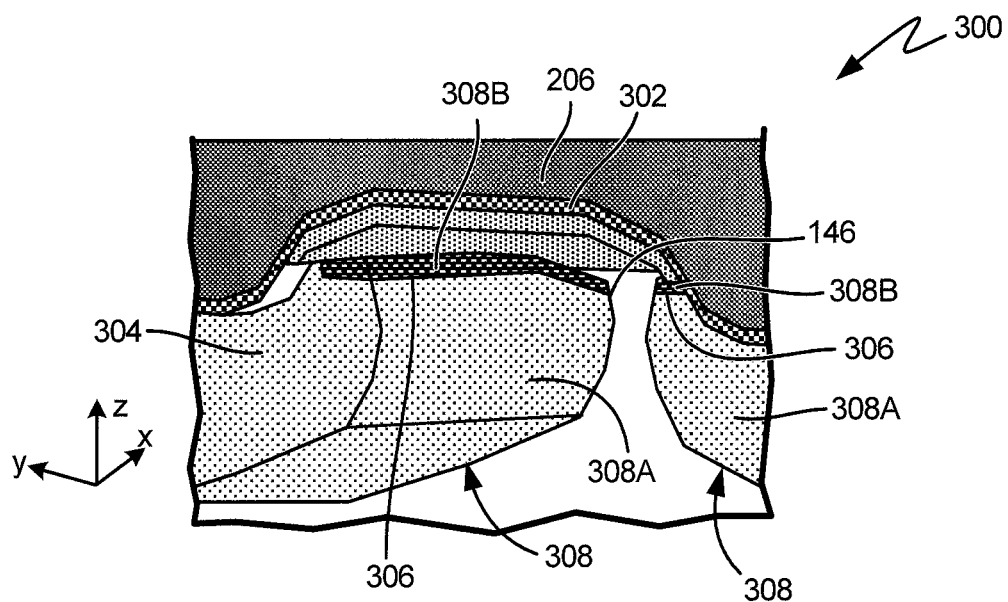
FIG. 3B is an inside view of the write head of FIG. 3A.

FIG. 3A shows a bearing surface view of a write head 300 that includes a low $B_S$ SS cap layer in accordance with one embodiment. FIG. 3B is an inside view of the write head 300 showing the low $B_S$ SS cap layer extending to a back portion of a main side shield layer. It should be noted that the write pole or main pole 204 is not shown in FIG. 3B in order to depict the low $B_S$ SS cap layer along an entire stripe height of the side shield in the x direction.

Write head 300 of FIGS. 3A and 3B includes elements similar to those included in write head 200 of FIG. 2. Additionally, a trailing edge shield seed layer 302 is shown over TSG 222 of write head 300. As can be seen in FIG. 3B, write head 300 includes side shields 308, with each side shield 308 having a main SS layer 308A and a low $B_S$ SS cap layer 308B. In some embodiments, main SS layer 308A may have a $B_S$ value of about 1.6 Tesla (T) and may be between about 20 nanometers (nm) and about 50 nm thick. In certain embodiments, main SS later may be a multi-layered structure. In different embodiments, low $B_S$ SS cap layer 308B may have a $B_S$ value between about 0.5 T and 1.0 T and may be between about 5 nm and about 30 nm thick. In the embodiment shown in FIG. 3B, low $B_S$ SS cap layer 308B extends from bearing surface 146 to a back end 304 of the write head 300. As indicated above, in certain embodiments, low $B_S$ SS cap layer 308B may not extend from the bearing surface 146 to the rear end 304 of write head 300 and may extend only partially along a top surface 306 of side shield 308 in the x-direction (e.g., the stripe height direction). In the embodiment of FIG. 3A, the low $B_S$ SS cap layer 308B may not extend substantially beyond overhang region 224 in the y direction (e.g., the cross-track direction). Further, in the embodiment shown in FIG. 3A, side shields 308 are separate portions on either side of the write pole 204 and are not connected together below the write pole. An insulating material 310 (shown in FIG. 3A) is included between the separate shield portions 208. In alternate embodiments, the side shield portions 208 may be connected below the write pole 204. Such embodiments of write heads are referred to herein as wrap-around writers. Examples of embodiments of wrap-around writers are shown in FIGS. 3C, 5D and 3E.

Figure 3C:
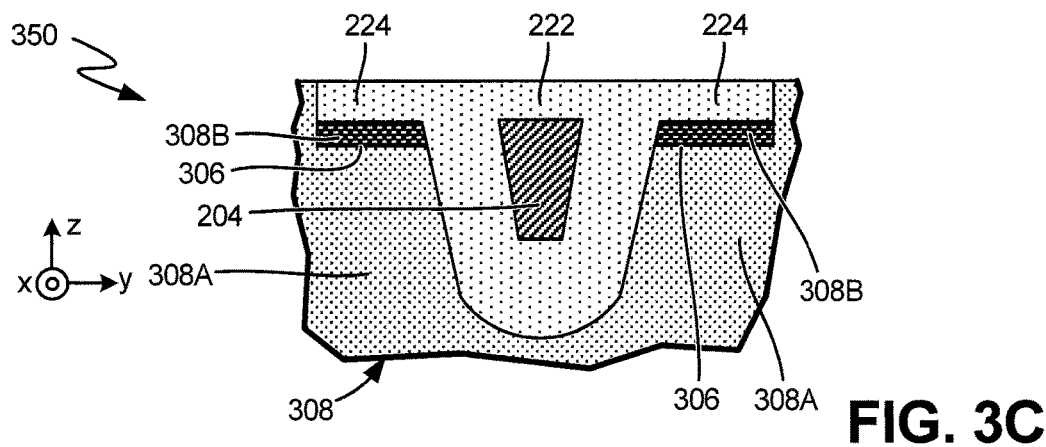
FIG. 3C shows a bearing surface view of a write head that includes a low saturation magnetization side shield cap layer in accordance with another embodiment.
Figure 3D:
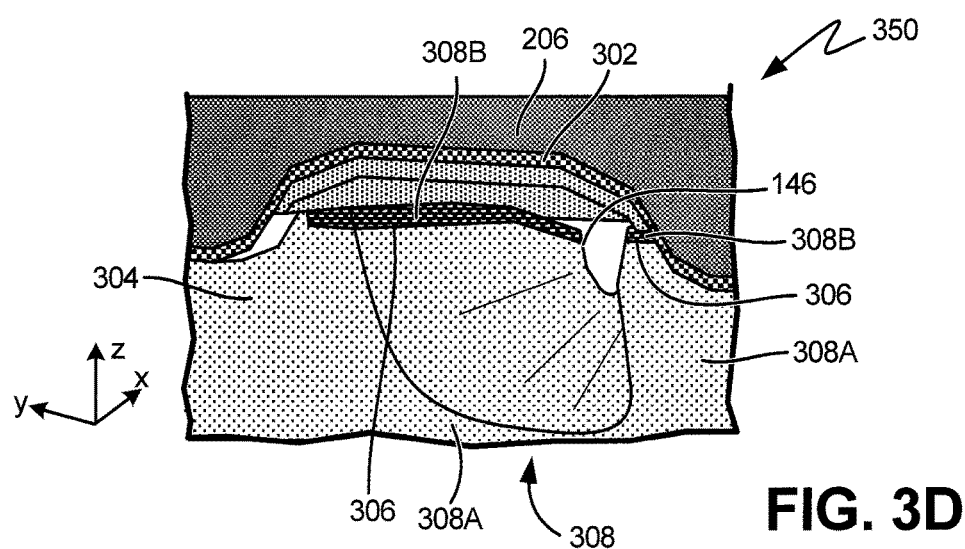
FIG. 3D is an inside view of the write head of FIG. 3C.
Figure 3E:
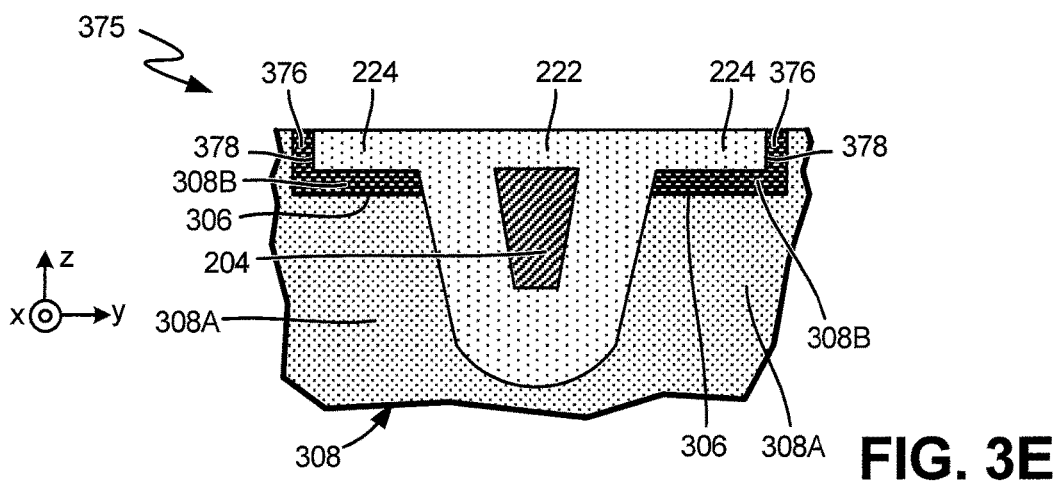
FIG. 3E shows a bearing surface view of a write head that includes a low saturation magnetization side shield cap layer in accordance with yet another embodiment.

FIG. 3C is a bearing surface view of a wrap-around write head 350 in accordance with one embodiment. FIG. 3D is an inside view of the write head 350 showing the low $B_S$ SS cap layer extending to a back portion of a main side shield layer.

In the interest of simplification, elements of write head 350 other than trailing edge shield 206, TSG 222, side shields 308 and write pole 204 are not shown in FIG. 3C. It should be noted that the write pole or main pole 204 is not shown in FIG. 3D in order to depict the low $B_S$ SS cap layer along an entire stripe height of the side shield in the x direction.

As indicated above, a difference between wrap-around write head 350 and write head 300 (of FIGS. 3A and 3B) is that, instead of side shields 308 being separated below write pole 204 as in write head 300 (of FIGS. 3A and 3B), the side shields 308 of write head 350 are joined under write pole 204. In other respects, wrap-around write head 350 and split side shield write head 300 (of FIGS. 3A and 3B) are substantially similar. In the embodiment of FIG. 3C, low $B_S$ SS cap layer 308B is positioned below overhang region 224 in a manner described above in connection with FIGS. 3A and 3B. Further, in the embodiment shown in FIG. 3C, low $B_S$ SS cap layer 308B may extend from the bearing surface 146 to a rear end 304 of the write head 350 as shown in FIG. 3D. In certain embodiments, low $B_S$ SS cap layer 308B may not extend from the bearing surface 146 to the rear end 304 of write head 350 and may extend only partially along a top surface 306 of side shield 308 in the x-direction (e.g., the stripe height direction). In the embodiment of FIG. 3C, the low $B_S$ SS cap layer 308B does not extend beyond overhang region 224 in the y direction (e.g., the cross-track direction).

FIG. 3E is a bearing surface view of a wrap-around write head 375 in accordance with another embodiment. Wrap-around write head 375 is substantially similar to wrap-around write head 350 of FIGS. 3C and 3D. However, in wrap-around write head 375, low $B_S$ SS cap layer 308B includes a vertical portion 376 that may extend to the trailing edge shield (not shown in FIG. 3E) in a z direction (e.g., a down-track direction) and is positioned on a side 378 of overhang region 224. In the embodiment shown in FIG. 3E, low $B_S$ SS cap layer 308B may extend from the bearing surface to a rear end (similar to 304 of FIG. 3D) of the write head 375. In certain embodiments, low $B_S$ SS cap layer 308B may not extend from the bearing surface to the rear end of write head 375.

Figure 4:
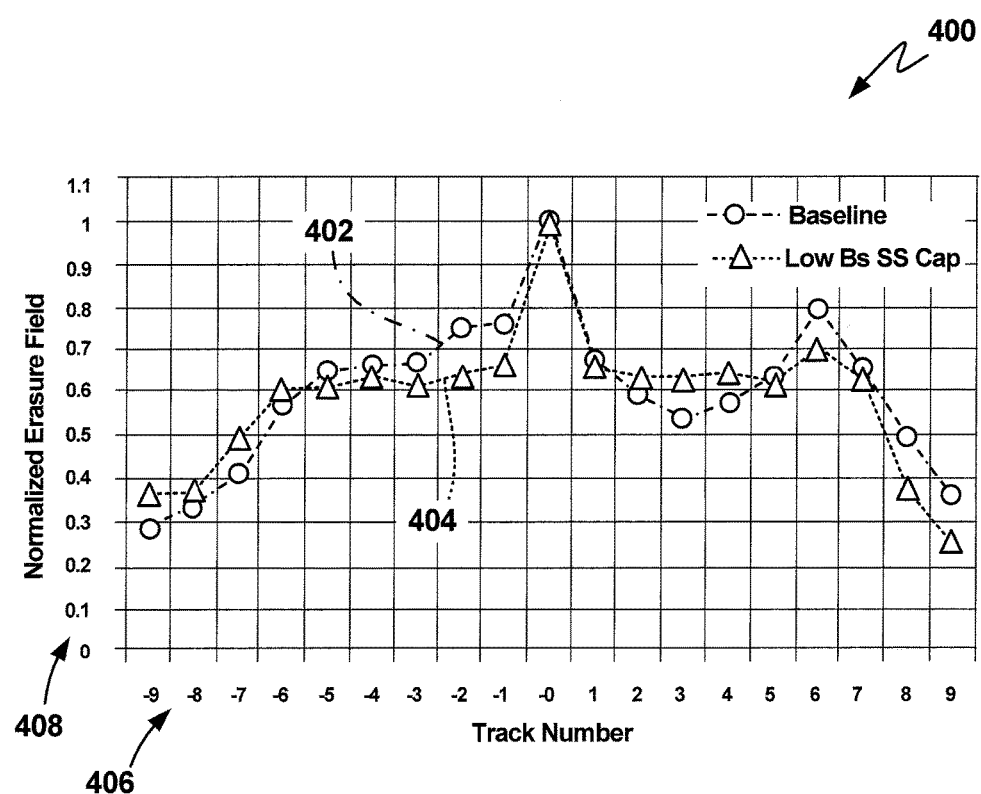
FIG. 4 is a graph of experimental results.

FIG. 4 is a graph 400 that includes plots of results obtained from write heads with and without a low $B_S$ SS cap layer. Plot 402 is for a baseline write head (e.g., a write head that does not include a low $B_S$ SS cap layer). Plot 404 is for a write head (e.g., 300, 350, 375) that includes a low $B_S$ SS cap layer. In FIG. 4, horizontal axis 406 represents track number and vertical axis 408 represents normalized erasure fields. Track 0 is the track on which the write operation with the write head takes place, and the track numbers on either side of track 0 denote tracks on either side of track 0. The recorded fields are maximum at each track during the writer operation of switching between opposite polarities where the current driving the main pole is between 1-4 GBPS (gigabits per second) frequency. A comparison of plots 402 and 404 shows that the erasure fields from the design with the low $B_S$ SS Cap are less compared to the baseline design. A comparison of plots 402 and 404 also shows that the low $B_S$ SS Cap makes the fields on both sides more symmetrical (as seen in plot 404). The region of the low $B_S$ (here 1.0 T) SS Cap receives considerable flux which leaks from the write pole close to its trailing edge. However, the low $B_S$ cap cannot generate the same amount of field as a 1.6 T material of the main shield layer would have generated, driven by the leaking write pole flux. This means that the peaks in the erasure field would be cut out.

As noted above, writer side shields may also suffer from an intermittent reversed shield condition (e.g., a condition in which an original or magnetization direction of the shields is switched). The change in magnetization direction may result in magnetic stress being concentrated onto the SS-TSG edge region, which may manifest in higher erasure fields. One example of a side shield design that has a potential to alleviate symptoms from the reversed shield condition is described below in connection with FIGS. 5A-5J.

Figure 5A:
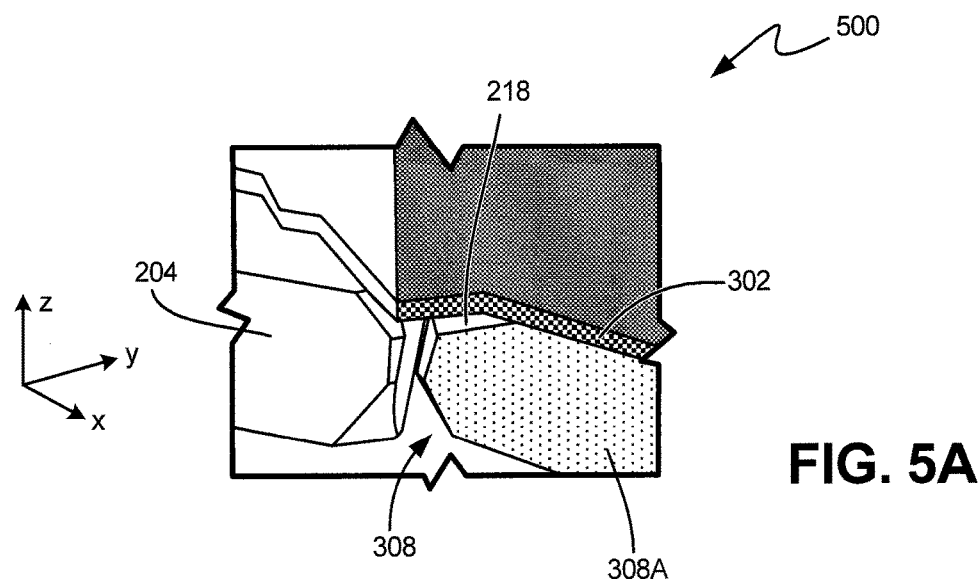
FIG. 5A shows a bearing surface view of a write head that includes a back step feature in accordance with one embodiment.
Figure 5B:
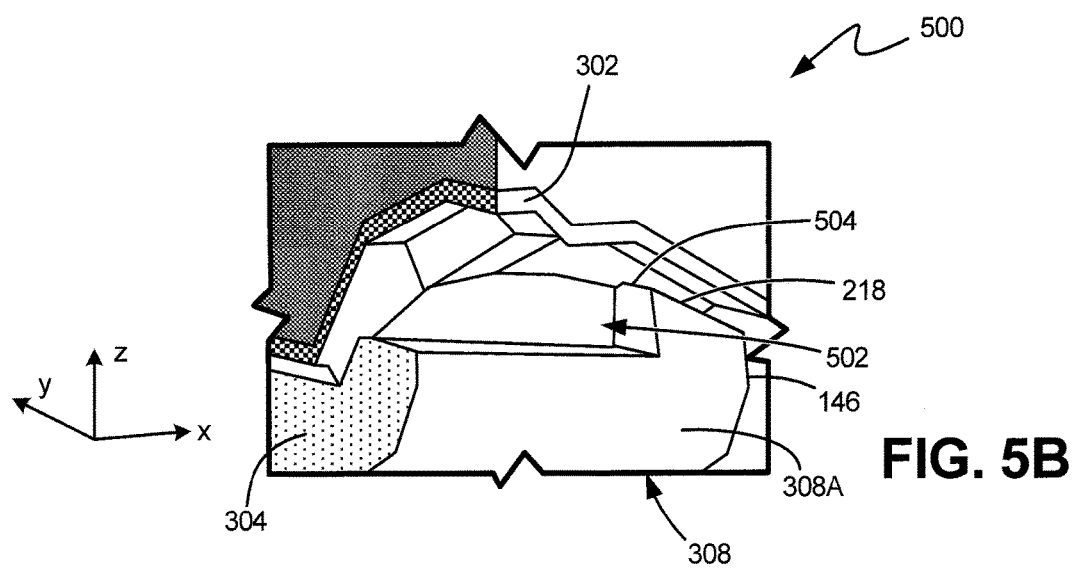
FIG. 5B is an inside view of the write head of FIG. 5A.

FIGS. 5A and 5B are ABS and inside views, respectively, of a write head embodiment 500 that includes a back step feature 502 behind the bearing surface 146 to help mitigate erasure fields generated from the reversed shield condition. It should be noted that the write pole or main pole 204 is not shown in FIG. 5B in order to depict the back step feature 502 within the side shield 308. The back step feature 502 may be formed by removing a portion of main side shield layer 308A up to, for example, 100-200 nm from the bearing surface 146 in the x direction or stripe-height direction. In some embodiments, the back step feature 502 does not extend beyond overhang region 224 in the y direction (e.g., the cross-track direction) and therefore the back step feature 502 is hidden in the view shown in FIG. 5A. Further, in the embodiment shown in FIGS. 5A and 5B, the back step feature 502 extends from a rear end 504 of trailing surface bevel 218 to the back end 304 of the write head 500 in the x-direction (e.g., the stripe height direction). In some embodiments, the back step feature 502 may not extend all the way to the back end 304 of write head 500 in the x-direction (e.g., the stripe height direction).

Figure 5C:
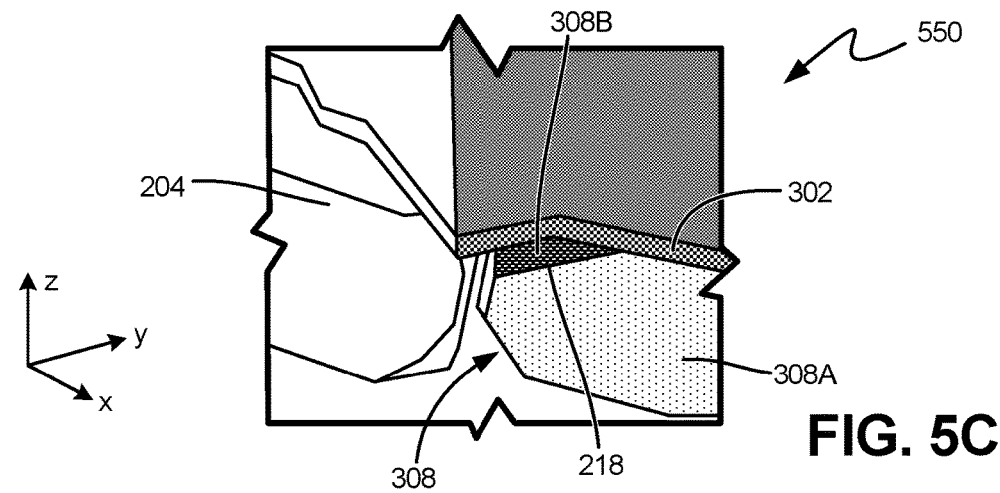
FIG. 5C shows a bearing surface view of a write head that includes a back step feature and a low saturation magnetization side shield cap layer in accordance with one embodiment.
Figure 5D:
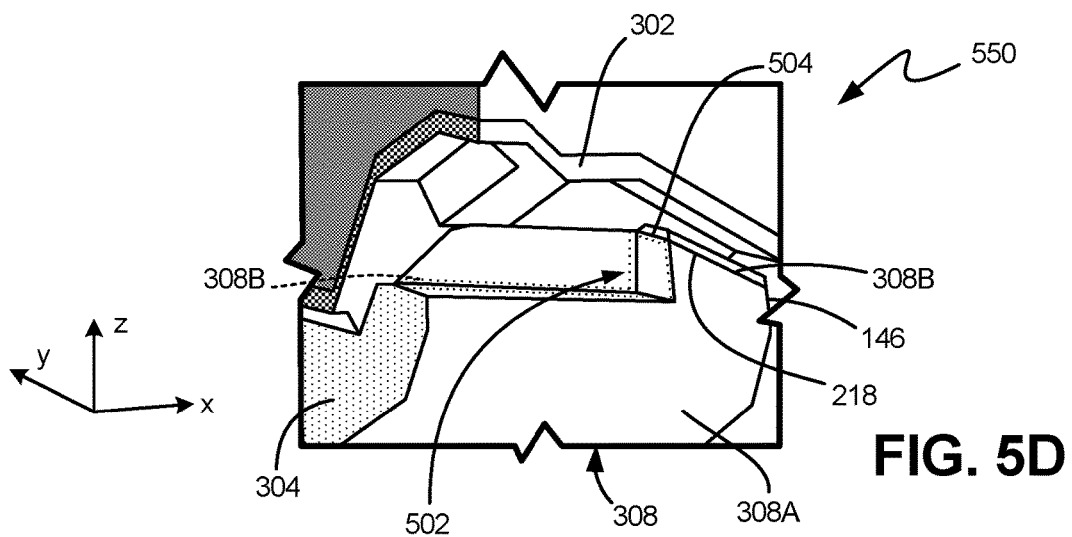
FIG. 5D is an inside view of the write head of FIG. 5C.
Figure 5E:
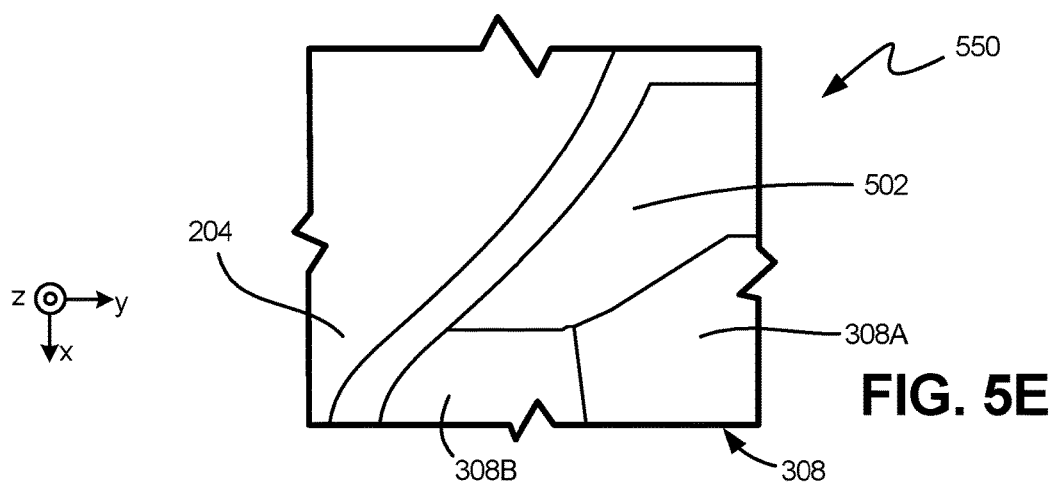
FIG. 5E is a top-down view of the write head of FIG. 5C.

FIGS. 5C, 5D and 5E are ABS, inside and top-down views, respectively, of a write head embodiment 550 that includes a back step feature 502 and a low $B_S$ SS cap layer 308B. Other than including the low $B_S$ SS cap layer 308B, write head 550 is substantially similar to write head 500 of FIGS. 5A and 5B. In the embodiment shown in FIGS. 5C, 5D and 5E, low $B_S$ SS cap layer 308B extends from ABS 146 to rear end 504 of trailing surface bevel 218 in the x-direction (e.g., the stripe height direction). However, in certain embodiments, the low $B_S$ SS cap layer 308B may also be included on back step feature 502. In such embodiments, the low $B_S$ SS cap layer 308B would extend from the ABS 146 to back end 304 of the write head 550. In some embodiments, the low $B_S$ SS cap layer 308B does not extend beyond overhang region 224 in the y direction (e.g., the cross-track direction).

Figure 5F:
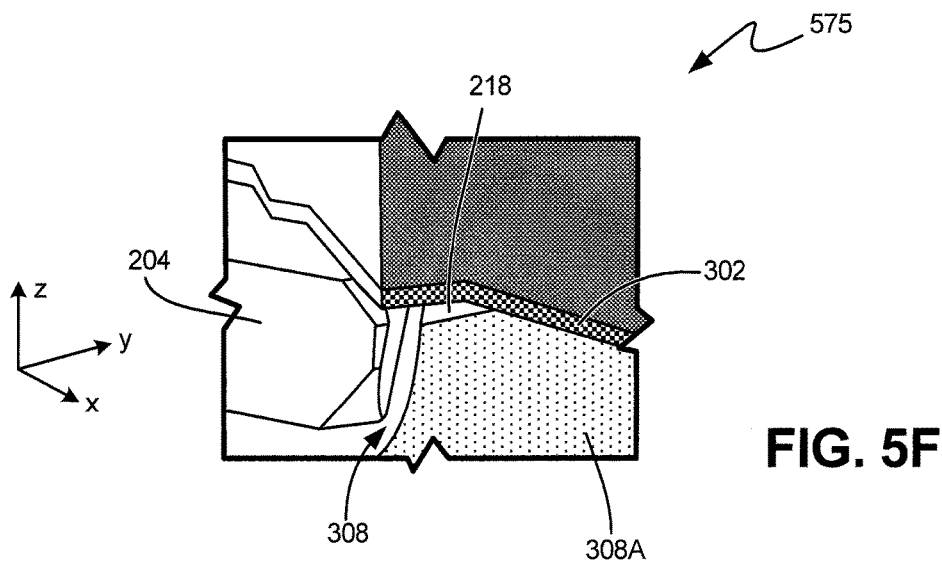
FIG. 5F shows a bearing surface view of a write head that includes a back step feature in accordance with another embodiment.
Figure 5G:
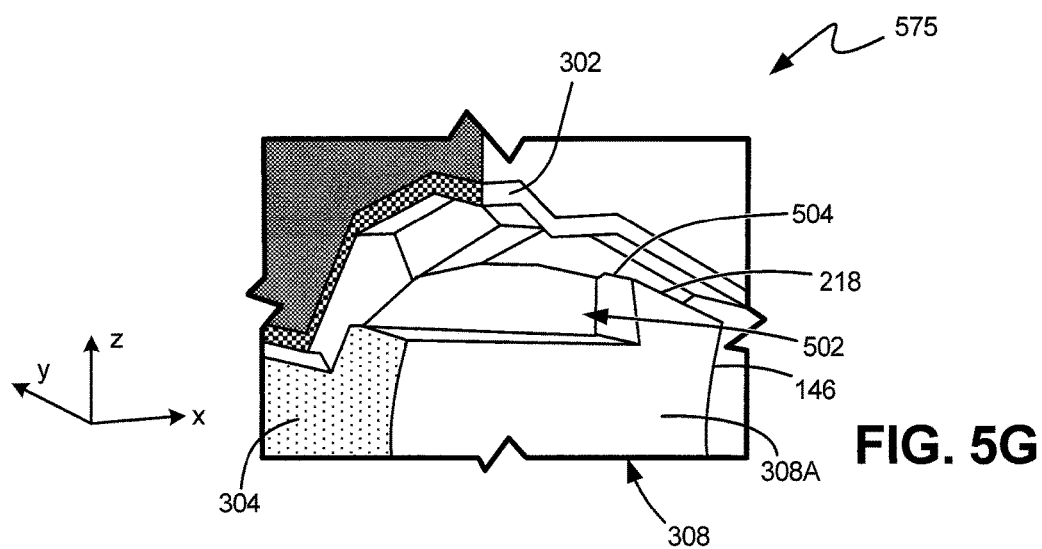
FIG. 5G is an inside view of the write head of FIG. 5F.

FIGS. 5F and 5G are ABS and inside views, respectively, of a wrap-around write head embodiment 575 that includes a back step feature 502 behind the bearing surface 146 to help mitigate erasure fields generated from the reversed shield condition. As indicated above, a difference between wrap-around write head 575 and write head 500 (of FIGS. 5A and 5B) is that, instead of side shields 308 being separated below write pole 204 as in write head 500 (of FIGS. 5A and 5B), the side shields 308 of write head 575 are joined under write pole 204. In other respects, wrap-around write head 575 and split side shield write head 500 (of FIGS. 5A and 5B) are substantially similar. Therefore, interest of brevity, a description of the similar elements is not repeated.

Figure 5H:
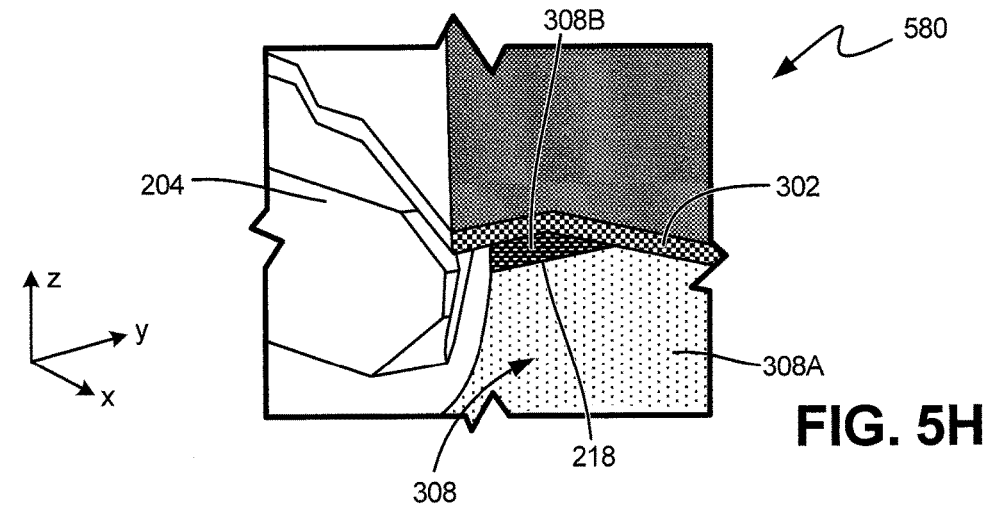
FIG. 5H shows a bearing surface view of a write head that includes a back step feature and a low saturation magnetization side shield cap layer in accordance with yet another embodiment.
Figure 5I:
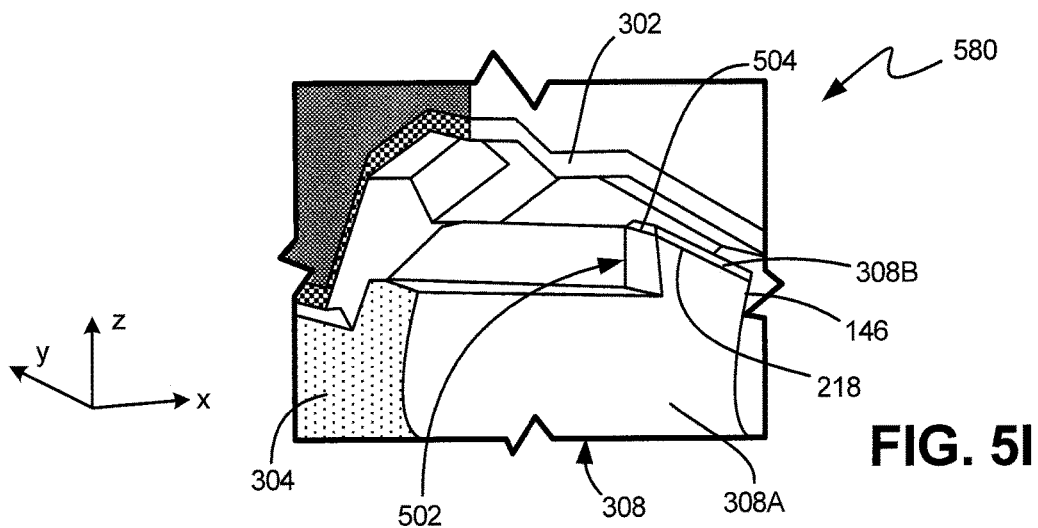
FIG. 5I is an inside view of the write head of FIG. 5H.
Figure 5J:
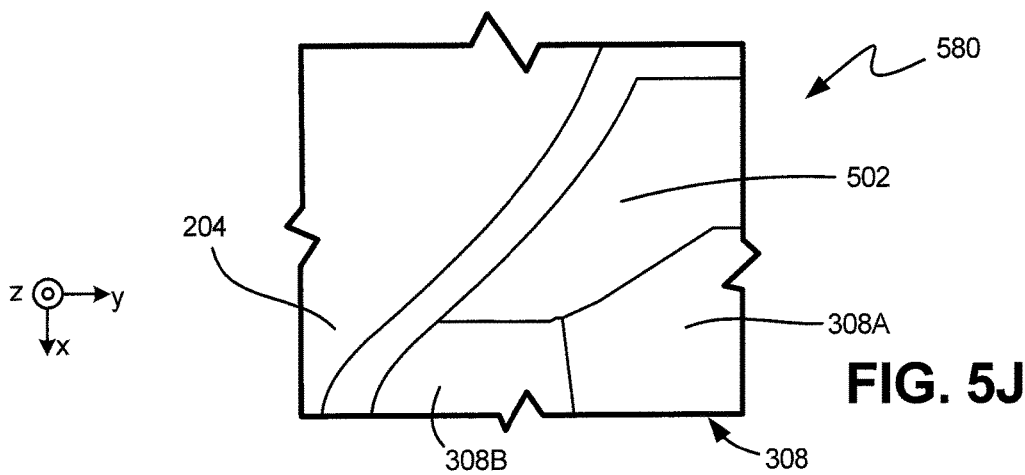
FIG. 5J is a top-down view of the write head of FIG. 5H.

FIGS. 5H, 5I and 5J are ABS, inside and top-down views, respectively, of a wrap-around write head embodiment 580 that includes a back step feature 502 and a low $B_S$ SS cap layer 308B. Other than including a wrap-around shield instead of a split side shield, write head 580 is substantially similar to write head 550 of FIGS. FIGS. 5C, 5D and 5E, and therefore a description of the similar elements is not repeated.

Table 1 included below shows different write head parameters obtained from simulations. Table 1 compares results of a baseline write head design (e.g., a write head without a low $B_S$ SS Cap layer and without a SS back step feature) and write head designs including one or more of the low $B_S$ SS Cap layer and the SS back step feature. In Table 1 below, different parameters are shown in percentage (%) over the performance of the respective write heads of a baseline design.

TABLE 1

| Write head design | Maximum effective field [%] | Down-track gradient [%] | Field angle [%] | Curvature [%] |
|---|---|---|---|---|
| Baseline | 0 | 0 | 0 | 0 |
| Back step | 0.82 | 4.26 | 1.58 | −7.58 |
| Back step + low $B_S$ SS Cap | 1.29 | 5.14 | 1.92 | −6.44 |

From Table 1, it is seen that there is a gain in field/writability and down-track gradient or error rate over a baseline write head design. The gains are even higher when there is a low $B_S$ SS Cap layer.

Figure 6:
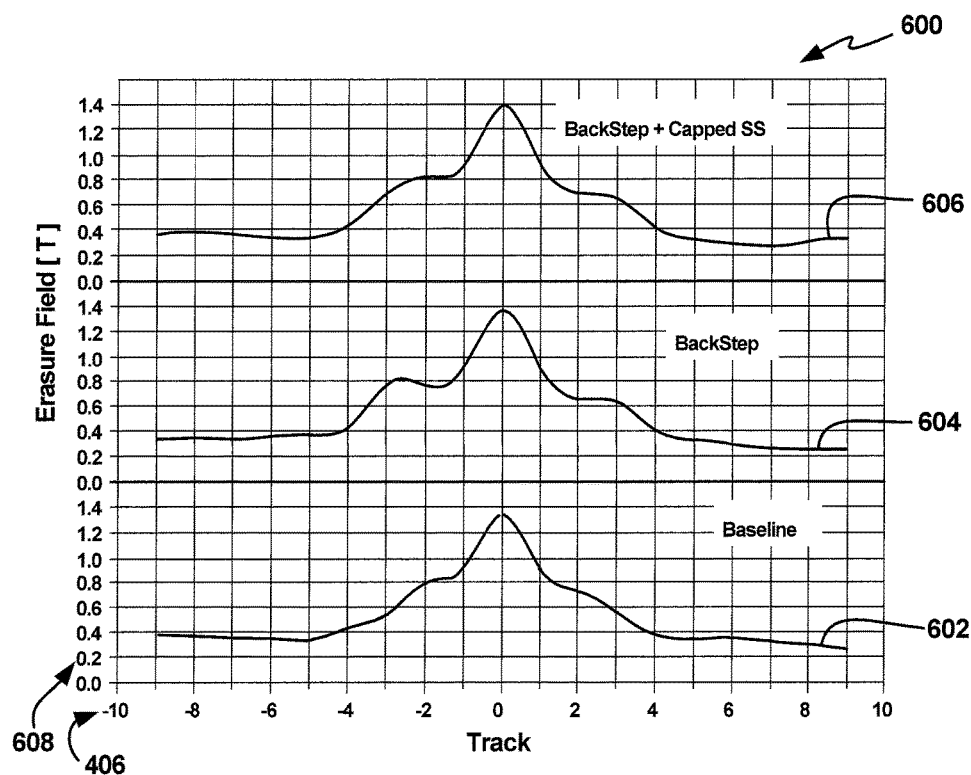
FIG. 6 is another graph of experimental results.

FIG. 6 is a graph 600 that include plots of results obtained from write head designs with and without at least one of a low $B_S$ SS Cap layer and a SS back step feature. Plot 602 is for a baseline write head (e.g., a write head without a low $B_S$ SS Cap layer and without a SS back step feature). Plot 604 is for a write head (e.g., 500, 575) that includes a SS back step feature and no low $B_S$ SS Cap layer. Plot 606 is for a write head (e.g., 550, 580) that includes a SS back step feature and a low $B_S$ SS Cap layer. In FIG. 6, horizontal axis 406 represents track number and vertical axis 608 represents erasure field in T. Track 0 is the track on which the write operations with the write heads take place, and the track numbers on either side of track 0 denote tracks on either side of track 0. In FIG. 6, the plots 602, 604, 606 are an average of the peak fields sensed by the side tracks. As can be seen in FIG. 6, erasure fields rise for the back step SS design (e.g., write head 500, 575) compared to the baseline design, especially between side tracks of 2-4 on both sides of the center track (e.g., track 0). A large amount of flux is dumped into the step part of the SS causing the erasure fields to flare up, as part of the SS is removed at the back. When the low $B_S$ SS Cap is included (e.g., write head 550, 580), the erasure field is reduced by the physical process described above (e.g., by restricting fields emanating from the low $B_S$ material during operation of the write head).

Figure 7:
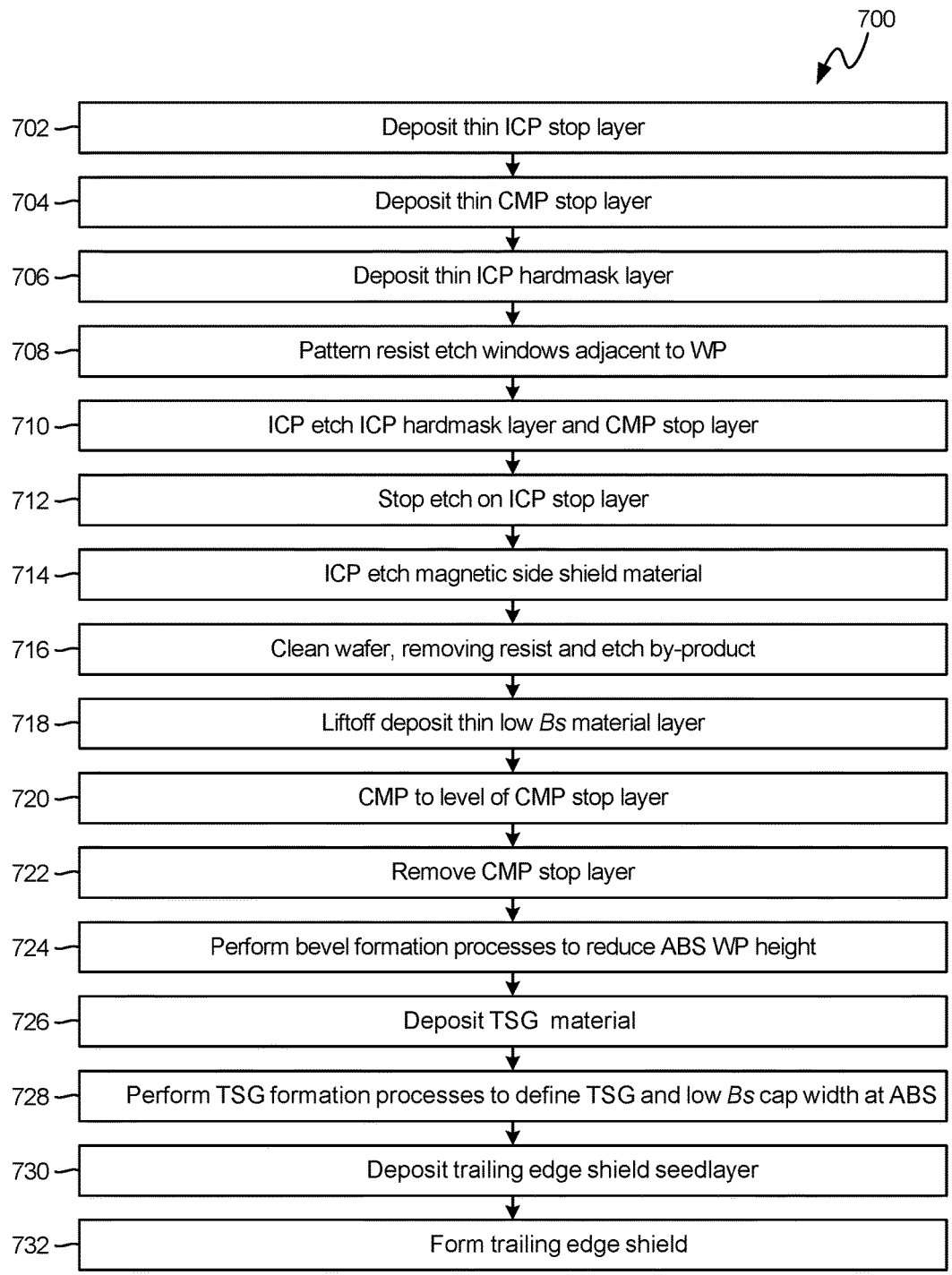
FIG. 7 is a flow diagram of a method embodiment.

FIGS. 7 and 8A-8J illustrate steps carried out during manufacturing of a write head such as 300 of FIGS. 3A and 3B. FIG. 7 is a flow diagram 700 of an example process sequence to form a capped side shield in a magnetic recording head such as 300. It should be noted that, while there are several approaches to forming a magnetic recording head with a capped SS, the method of FIG. 7 is an example of a process that gives consideration for control of tolerances of key elements of the recording head design. It should also be noted that, although the process described below in connection with FIGS. 7 and 8A-8J is for capped side shield formation in a split side shield write head, similar process steps may be taken with a wrap-around shield design for these features.

Figure 8A:
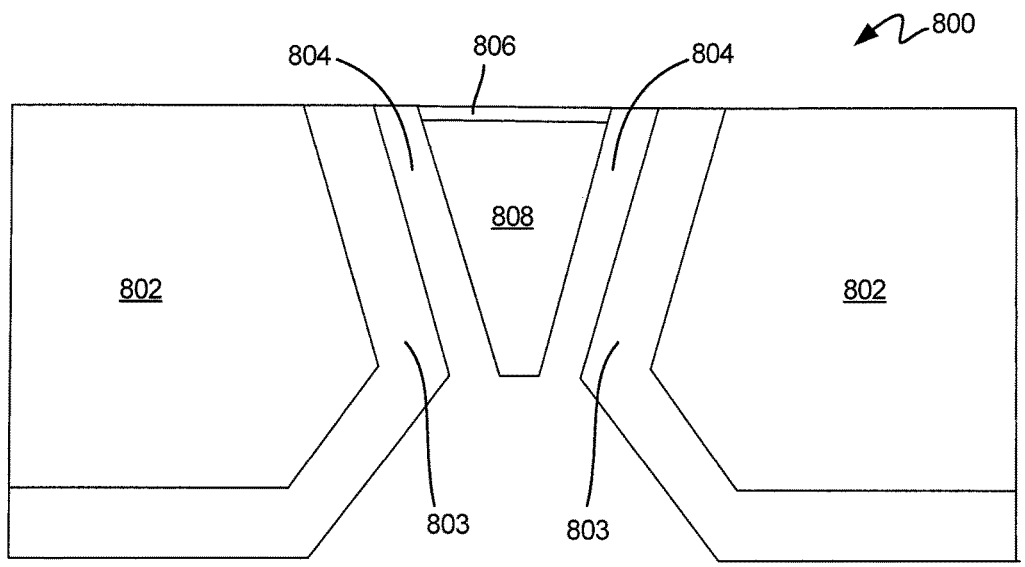
FIGS. 8A-8J illustrate process steps for fabricating a write head of the type shown in FIG. 3A.
Figure 8B:
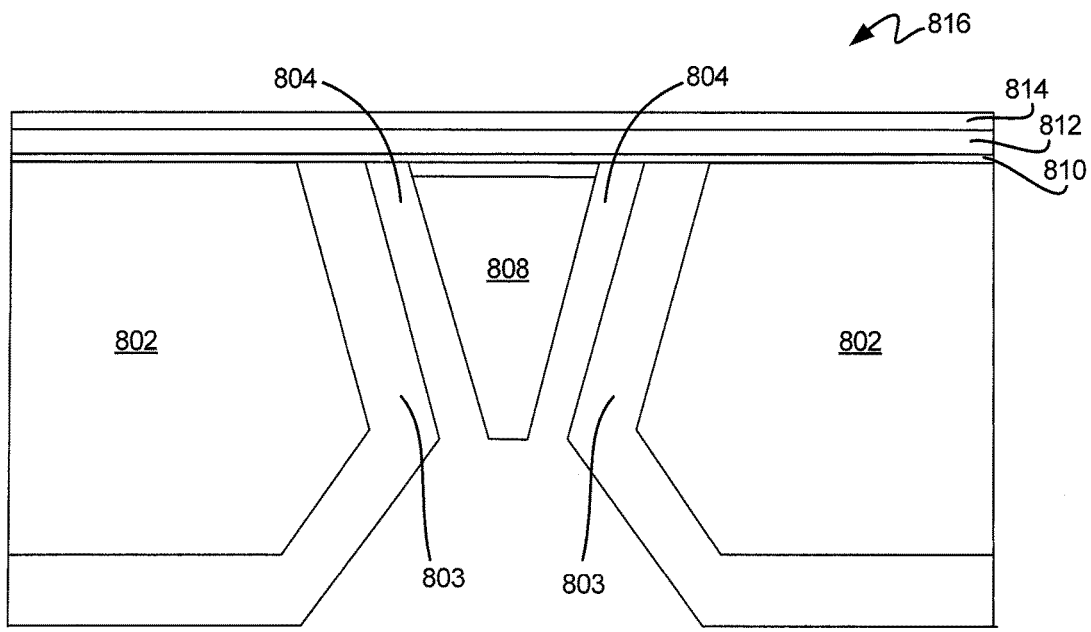
Figure 8C:
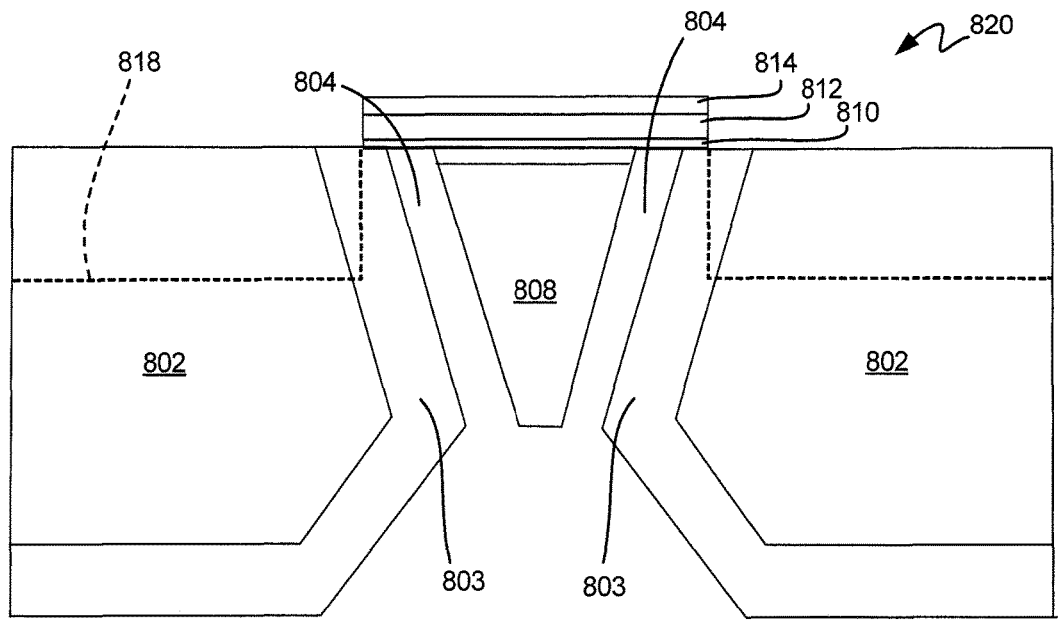

The process sequence intercepts the recording head build after side shields adjacent to a write pole (WP) have been planarised as shown in FIG. 8A. FIG. 8A illustrates a first partial write head structure 800 that includes a variety of materials that comprise the planar surface. The materials/layers include magnetic side shield layers 802, side shield seed layers 803, non-magnetic write gap layers 804 and a protective non-magnetic write pole cap layer 806. The write pole layer is denoted by reference numeral 808.

Starting with first partial write head structure 800, steps 702-706 of flowchart 700 of FIG. 7 are performed. Step 702 involves depositing an inductively coupled plasma (ICP) stop later 810. This is followed by depositing a chemical-mechanical planarization or polishing (CMP) stop layer 812 at step 704. Then, at step 706, an ICP hardmask layer 814 is deposited. The performance of steps 702-706 provides a second partial write head structure 816 shown in FIG. 8B.

On second partial write head structure 816, photoresist etch windows are patterned adjacent to each side of the write pole 808 in accordance with step 708, and layers 814 and 812 are etched by a first etching process in accordance with step 710. This includes shaping the ICP hardmask 814 and CMP stop 812 using fluorine based chemistry or any of a range of alternative chemistries. The first etching process is stopped on the ICP stop layer 810 in accordance with step 712. Chemistry is then switched, and the process proceeds to step 714 where the ICP stop layer 810 and the magnetic side shield layers 802 are etched using a patterned hardmask for a fixed time to achieve a nominal side shield etch depth, which is denoted by reference numeral 818 in FIG. 8C. This results in a third partial write head structure 820 of FIG. 8C. Structure 820 is cleaned in accordance with step 716 to remove any unwanted by-product, thereby preparing the wafer surface for liftoff deposition of a SS cap layer (e.g., a 1.0 T material layer) having lower magnetic flux carrying capacity than the magnetic side shield layers 802.

Figure 8D:
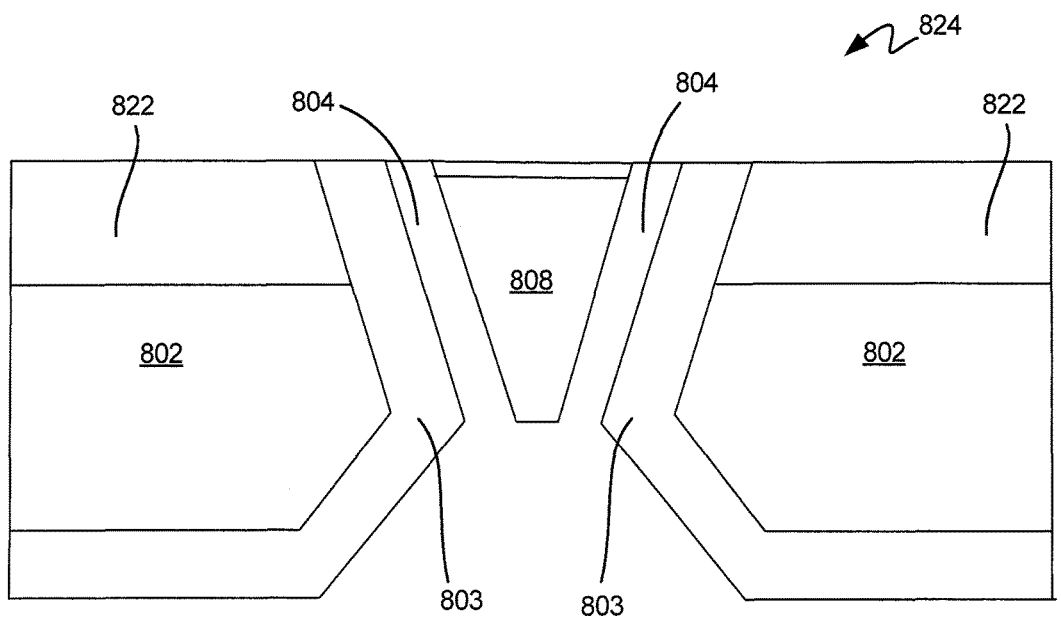
Figure 8E:
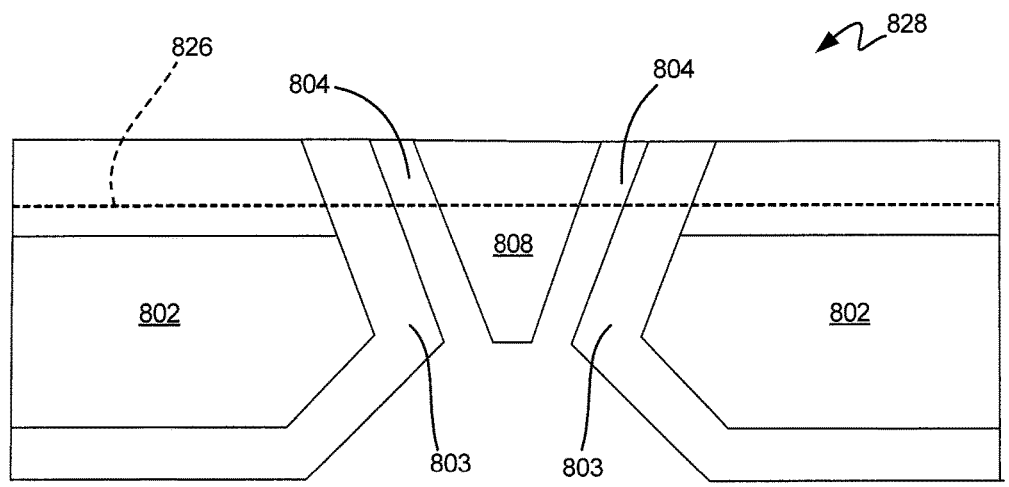
Figure 8F:
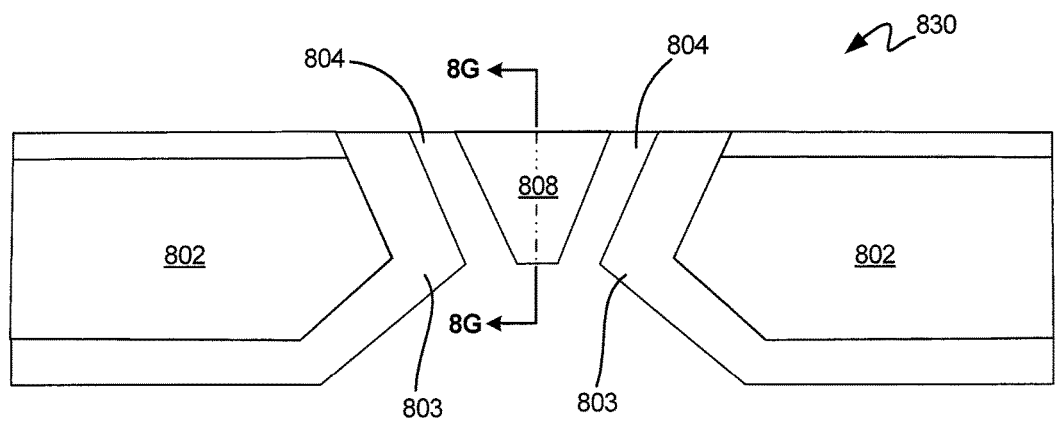
Figure 8G:
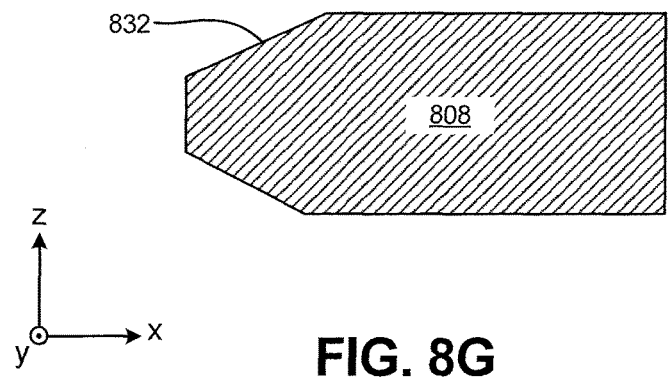

Process steps 718-722 of FIG. 7 are then performed on the third partial write head structure 820. At step 718, liftoff deposition of a thin low $B_S$ (e.g., 1.0 T) material layer is carried out. At step 720, CMP is carried out to bring the thin low $B_S$ material layer to a level of CMP stop layer 812. At step 722, CMP stop layer 812 is removed by any suitable process. Performance of steps 718-722 creates an infill of the low $B_S$ material (denoted by reference numeral 822) having a surface which is planar with the non-magnetic cap 806 on write pole 808, and provides a fourth partial write head structure 824 is shown in FIG. 8D.

At step 724, a first material removal process is carried out to reduce a height of the write pole layer 808 at the ABS. The first material removal proves results in the upper surface of the write pole being moved to a lower position shown by dashed line 826 in FIG. 8E, which shows a fifth partial write head structure 828.

Sidewalls of the write pole 808 are tapered and a write pole width decreases with reduction in write pole height due the tapered nature of the writer pole 808. In a plane orthogonal to the ABS, a sloped profile is induced in the write pole at step 724. Tapering the write pole in this plane serves to increase a magnetic flux density at the ABS, which improves writeablity performance. Better writeability boosts the areal density capability of a data storage device such as a disc drive. Completion of step 724 provides a sixth partial write head structure 830 shown in FIG. 8F. Sixth partial write head structure 830 includes a new surface 832 where the write pole height is smaller than any reference point behind the ABS. A sectional view showing surface 832 is provided in FIG. 8G.

Figure 8H:
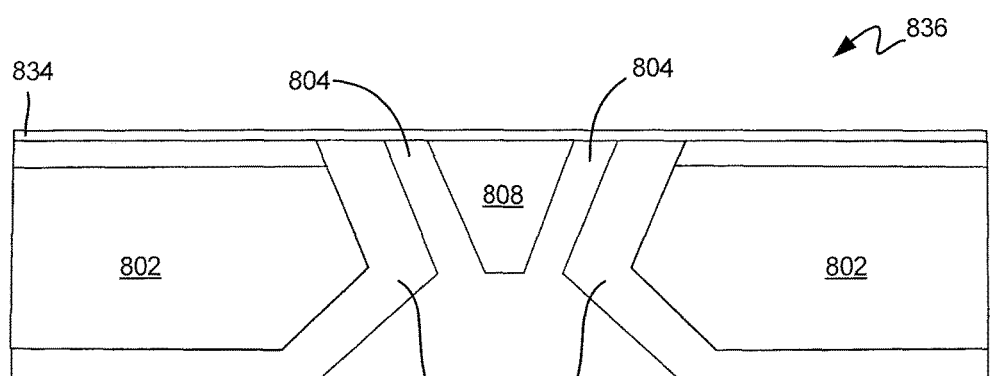
Figure 8I:
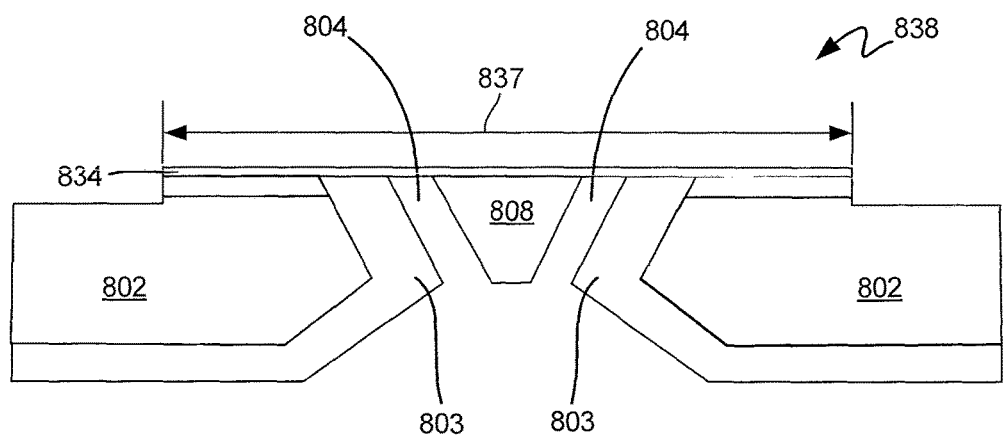
Figure 8J:
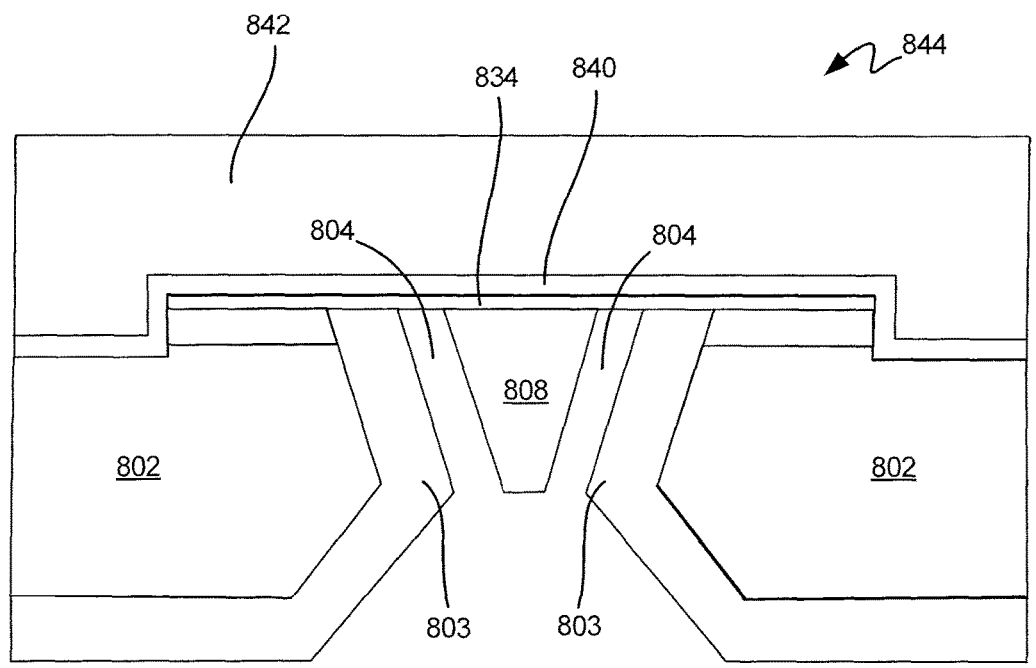

On sixth partial write head structure 630, to control a write field gradient, a shaped gap (e.g., a TSG) at the top or trailing edge of the write pole 808 on the ABS plane is fabricated. This is achieved by performing steps 726 and 728 in method 700 of FIG. 7. At step 726, a cross-track non-magnetic gap layer 834 is deposited to provide a seventh partial write head structure 836, which is shown in FIG. 8H. At step 728, a cross-track gap or TSG formation process is carried out to define cross-track widths of the TSG and the low $B_S$ SS cap layer portions 822 at the ABS. The non-magnetic gap layer 834 is shaped using a photoresist mask, and ion beam etching (IBE), for example, is performed to achieve a trailing edge gap (e.g., TSG) of nominal width 837 shown in FIG. 8I, which illustrates an eighth partial write head structure 838. An over-etch is applied during formation of non-magnetic gap layer 834 to remove portions of the low $B_S$ SS cap layer 822 of on top of side shield layers 802. This process results in confining a width of the low $B_S$ SS cap layer 822 not to exceed the width of the non-magnetic gap layer 834.

Finally, steps 730 and 732 of method 700 are performed on eighth partial write head structure 838 to fabricate a trailing edge shield or trailing edge shield. At step 730, a trailing edge shield seed layer 840 is deposited on the top surface of structure 838. This is followed by patterning and plating magnetic trailing edge shield material 842 shown in FIG. 8J. Removal of photoresist, backfilling with alumina, and CMP are carried out to achieve a planar trailing edge shield surface or top surface of structure 844 of FIG. 8J.

The write head formation process described above in connection with FIGS. 7 and 8A through 8J and can also produce the back step design in FIGS. 5C-5E. The cap recess from the ABS can be achieved by performing all steps in the process shown in FIG. 7 with one small modification. The modification involves recessing the photomask used on the performance of step 708 to a desired design point, which may be one of a range of possible values. Also, it should be noted that a process similar to that described above in connection with FIGS. 7 and 8A through 8J may be used to form write heads of the type shown in FIGS. 3D and 3E. Further, the write heads of the type shown in FIGS. 3D and 3E may also be fabricated with a back step feature in some embodiments.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A write head comprising:
a bearing surface;
a write pole having a front surface that forms a portion of the bearing surface;
a trailing edge shield above the write pole;
a trailing edge shield gap layer between the trailing edge shield and the write pole;
a bi-layered side shield for the write pole, the bi-layered side shield is positioned below the trailing edge shield and comprises a main side shield layer having a trailing surface bevel and a low saturation magnetization cap layer on the trailing surface bevel, the low saturation magnetization layer having a front surface that forms a portion of the bearing surface, the low saturation magnetization cap layer comprises a substantially horizontal portion at the bearing surface that is positioned below the trailing edge shield gap layer and is in contact with the trailing edge shield gap layer.

2. The write head of claim 1 and wherein the bi-layered side shield comprises a first bi-layered side shield portion on a first side of the write pole and a second bi-layered side shield portion on a second side of the write pole, and wherein the first bi-layered side shield portion is separated from the second bi-layered side shield portion below the write pole.

3. The write head of claim 1 and wherein the bi-layered side shield comprises a first bi-layered side shield portion on a first side of the write pole and a second bi-layered side shield portion on a second side of the write pole, and wherein the first bi-layered side shield portion is connected to the second bi-layered side shield portion below the write pole.

4. The write head of claim 1 and wherein the low saturation magnetization cap layer comprises a substantially vertical portion that is positioned on a side of the trailing edge shield gap layer and is in contact with the trailing edge shield gap layer.

5. The write head of claim 1 and wherein the bi-layered side shield comprises the main side shield layer that includes a portion that is below the low saturation magnetization cap layer, wherein the main side shield layer has a stripe height extending from the bearing surface to a back of the write head in a direction perpendicular to the bearing surface.

6. The write head of claim 5 and wherein the low saturation magnetization cap layer has a stripe height that is less than or equal to the stripe height of the main side shield layer.

7. The write head of claim 5 and further comprising a back step feature in an upper portion of the main side shield layer of the bi-layered side shield, wherein the back step feature is recessed behind the bearing surface.

8. The write head of claim 7 and wherein a surface of the back step feature is without the low saturation magnetization cap layer.

9. The write head of claim 7 and wherein a surface of the back step feature comprises the low saturation magnetization cap layer.

10. The write head of claim 7 and wherein the main side shield layer of the bi-layered side shield comprises a lower portion that is below the back step feature.

11. An apparatus comprising:
a bearing surface;
a write pole having a front surface that forms a portion of the bearing surface; and
a side shield for the write pole, the side shield comprising:
a low saturation magnetization cap layer having a front surface that forms a portion of the bearing surface; and
a main side shield layer having a back step feature recessed behind the bearing surface and a trailing surface bevel on which the low saturation magnetization cap layer is disposed, the main side shield layer having a saturation magnetization that is higher than a saturation magnetization value of the low saturation magnetization cap layer, and a width of the back step feature is substantially equal to a width of the low saturation magnetization cap layer.

12. The apparatus of claim 11 and wherein a width of the main side shield layer at the bearing surface is greater than the width of the low saturation magnetization cap layer at the bearing surface.

13. The apparatus of claim 11 and further comprising a trailing edge shield gap layer over the write pole and over the low saturation magnetization cap layer.

14. The apparatus of claim 11 and wherein the side shield comprises a first portion on a first side of the write pole and a second portion on a second side of the write pole, and wherein the first portion is separated from the second portion below the write pole.

15. The apparatus of claim 11 and wherein the side shield comprises a first portion on a first side of the write pole and a second portion on a second side of the write pole, and wherein the first portion is connected to the second portion below the write pole.

16. The apparatus of claim 11 and wherein a portion of the main side shield layer is below the back step feature.

17. A write head comprising:
a bearing surface;
a write pole having a front surface that forms a portion of the bearing surface;
a trailing edge shield above the write pole;
a trailing edge shield gap layer between the trailing edge shield and the write pole; and
a bi-layered side shield for the write pole, the bi-layered side shield is positioned below the trailing edge shield and comprises a cap layer and a main side shield layer, below the cap layer, having a back step feature in an upper portion of the main side shield layer, with a lower portion of the main side shield layer having an upper surface that comprises a bottom surface of the back step feature, the back step feature being recessed behind the bearing surface and having a width that is substantially equal to a width of the cap layer.

18. The write head of claim 17 and wherein the cap layer comprises a low saturation magnetization cap layer over the main side shield layer.

* * * * *